(12) United States Patent
Pandey et al.

(10) Patent No.: US 9,038,011 B2
(45) Date of Patent: May 19, 2015

(54) HORIZONTAL INTERCONNECTS CROSSTALK OPTIMIZATION

(71) Applicant: QUALCOMM Incorporated, San Diego, CA (US)

(72) Inventors: Shree Krishna Pandey, San Diego, CA (US); Changyu Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/926,830

(22) Filed: Jun. 25, 2013

(65) Prior Publication Data

US 2014/0252637 A1 Sep. 11, 2014

Related U.S. Application Data

(60) Provisional application No. 61/775,063, filed on Mar. 8, 2013.

(51) Int. Cl.
*G06F 17/50* (2006.01)

(52) U.S. Cl.
CPC ........ *G06F 17/5081* (2013.01); *G06F 17/5036* (2013.01); *G06F 17/5077* (2013.01); *G06F 2217/82* (2013.01)

(58) Field of Classification Search
USPC ......... 716/106–107, 110–111, 115, 119, 126, 716/132
See application file for complete search history.

(56) References Cited

U.S. PATENT DOCUMENTS

| | | | |
|---|---|---|---|
| 6,342,823 B1 | 1/2002 | Dansky et al. | |
| 2003/0126564 A1 | 7/2003 | Elzinga | |
| 2010/0201459 A1* | 8/2010 | Kawaguchi et al. | 333/204 |
| 2011/0180942 A1* | 7/2011 | Oikawa | 257/786 |
| 2013/0127559 A1* | 5/2013 | Lin et al. | 333/1 |

OTHER PUBLICATIONS

International Search Report and Written Opinion—PCT/US2014/020558—ISA/EPO—May 27, 2014.

* cited by examiner

*Primary Examiner* — Paul Dinh
(74) *Attorney, Agent, or Firm* — Loza & Loza, LLP

(57) ABSTRACT

A method, an apparatus, and a computer program product for wireless communication are provided. The apparatus generates a plurality of interconnect patterns for a set of longitudinal channels that are occupied by horizontal interconnects. Each interconnect pattern may be different from the other interconnect patterns. Each interconnect pattern may define relative locations for the set of horizontal interconnects and gap channels. Highest crosstalk is determined for each of the interconnect patterns and the interconnect pattern with the minimum highest crosstalk is selected as a preferred pattern. The highest crosstalk may comprise far-end crosstalk or near-end crosstalk and may be calculated for a range of frequencies or for a plurality of frequencies. The crosstalk may be calculated by modeling the interconnects as transmission lines.

65 Claims, 11 Drawing Sheets

HORIZONTAL INTERCONNECTS CROSSTALK OPTIMIZATION

CROSS-REFERENCE TO RELATED APPLICATIONS

This application claims priority to and the benefit of U.S. Provisional Application No. 61/775,063, titled "Horizontal Interconnects Crosstalk Optimization," filed on Mar. 8, 2013, the entire content of which is incorporated herein by reference.

BACKGROUND

1. Field

Various features relate generally to apparatus comprising integrated circuit devices and more particularly to optimizing patterns of interconnects used to connect devices within the apparatus.

2. Background

In higher speed semiconductor integrated circuit (IC) devices, the layout and configuration of horizontal interconnects, which carry signals to and from ICs mounted on a circuit board or chip carrier, can play a critical role in signal integrity and can limit achievable maximum frequencies associated with the semiconductor device. Signaling rates continue to increase to obtain performance improvements in certain classes of high-speed semiconductor devices. In one example, the Joint Electron Device Engineering Council (JEDEC) standards for consecutive generations of synchronous dynamic random-access memory (SDRAM), including double data rate (DDR) SDRAM typically provide for increases in speed for later generations. One generation of Low Power DDR (LPDDR) SDRAM defined by JEDEC may provide for speeds that are double the speed of one or more preceding generations of LPDDR. Crosstalk between adjacent interconnects increases as signaling rates increase.

Conventionally, semiconductor designers employ intuitive insight in the design of horizontal interconnect patterns, configurations and assignments for coupling high-speed semiconductor devices. This design process is typically iterative and time-consuming, and often yields less than optimal results. Conventional methods for interconnect pattern optimization are not scalable and/or require a-priori knowledge. For instance, some prior art approaches focus on a very small problem size (up to 2 signals only) and cannot generally be scaled to larger interconnect patterns (e.g., to a full DDR interface design). Conventional approaches do not account for variable numbers of signal and power/ground interconnects and gaps that are available for placement between interconnects. In some conventional systems, a-priori knowledge is required including, for example, a-priori knowledge of an inductance matrix in an interconnect pattern when optimizing for simultaneous switching noise.

Therefore, a solution is needed that optimizes interconnect patterns for minimum crosstalk for an arbitrary number of signal and power/ground interconnects.

SUMMARY

In an aspect of the disclosure, a method, a processor-readable storage medium, and an apparatus are provided that may be employed or adapted for optimizing interconnect patterns in a semiconductor device.

In an aspect of the disclosure, a plurality of interconnect patterns is generated for a set of horizontal interconnects. The interconnect patterns may be used for configuring a set of interconnects on one or more layers of a circuit board or chip carrier. Each interconnect pattern may be different from each of the other interconnect patterns. Each interconnect pattern may define a plurality of longitudinal slots. One or more of the longitudinal slots may be occupied by the set of interconnects.

In some embodiments, the set of longitudinal slots comprises at least one unoccupied longitudinal slot. The plurality of interconnect patterns may define pluralities of longitudinal slots provided on at least two substantially parallel planes within the one or more layers of the circuit board. The at least two substantially parallel planes may be provided between two substantially parallel reference planes. Two interconnect patterns may be considered to be different from one another if the two interconnect patterns assign at least one interconnect to different longitudinal slots.

In an aspect of the disclosure, a highest crosstalk is determined for each of the interconnect patterns. The highest crosstalk for the each interconnect pattern may correspond to one of the longitudinal slots. The highest crosstalk for each of the interconnect patterns may be determined for a plurality of frequencies. The highest crosstalk for each of the interconnect patterns may be determined for a range of frequencies. The highest crosstalk may be generated by the corresponding longitudinal slot. The corresponding longitudinal slot may be afflicted by the crosstalk calculated for the pattern of interconnects.

In some embodiments, the highest crosstalk for each of the interconnect patterns is determined by modeling the set of interconnects as microstrip or dual stripline transmission lines and the highest crosstalk for the each interconnect pattern may comprise far-end crosstalk.

In some embodiments, the highest crosstalk for each of the interconnect patterns is determined by modeling the set of interconnects as stripline transmission lines and the highest crosstalk for the each interconnect pattern may comprise near-end crosstalk.

In an aspect of the disclosure, a preferred interconnect pattern is selected from the plurality of interconnect patterns. The preferred interconnect pattern may provide a lower highest crosstalk than the highest crosstalk associated with each of the other interconnect patterns.

In an aspect of the disclosure, a set of horizontal interconnects may be formed on a substrate, chip carrier or circuit board in accordance with the preferred interconnect pattern. The horizontal interconnect pattern may control an arrangement of vertical interconnects that are substantially orthogonal to the one or more layers. The combination of the preferred interconnect pattern and the vertical interconnect pattern may be calculated to provide a lower highest crosstalk associated with the combination than the highest crosstalk associated with other combinations of horizontal and vertical interconnect patterns. The highest crosstalk associated with the combination may relate to crosstalk associated with one of a vertical interconnect or a horizontal interconnect.

In an aspect of the disclosure, an apparatus for optimizing interconnect patterns in a semiconductor device comprises a computer readable medium and a processing system configured to generate a plurality of interconnect patterns, determine a highest crosstalk for each of the interconnect patterns, and select a preferred interconnect pattern from the plurality of interconnect patterns. The plurality of interconnect patterns may be used to configure a set of interconnects on one or more layers of a circuit board. The preferred interconnect pattern may provide a lower highest crosstalk than the highest crosstalk associated with each of the other interconnect patterns. Each interconnect pattern may be different from the other interconnect patterns. Each interconnect pattern may define a plurality of longitudinal slots including longitudinal slots occupied by the set of interconnects. The highest crosstalk for the each interconnect pattern may correspond to one of the longitudinal slots.

In an aspect of the disclosure, an apparatus for optimizing interconnect patterns in a semiconductor device comprises means for generating a plurality of interconnect patterns, means for determining a highest crosstalk for each of the interconnect patterns, and means for selecting a preferred interconnect pattern from the plurality of interconnect patterns. The plurality of interconnect patterns may be used for configuring a set of interconnects on one or more layers of a circuit board. The preferred interconnect pattern may provide a lower highest crosstalk than the highest crosstalk associated with each of the other interconnect patterns. Each interconnect pattern may be different from the other interconnect patterns. Each interconnect pattern may define a plurality of longitudinal slots including longitudinal slots occupied by the set of interconnects. The highest crosstalk for the each interconnect pattern may correspond to one of the longitudinal slots.

In an aspect of the disclosure, a processor-readable storage medium has one or more instructions which, when executed by at least one processing circuit, cause the at least one processing circuit to generate a plurality of interconnect patterns, determine a highest crosstalk for each of the interconnect patterns, and select a preferred interconnect pattern from the plurality of interconnect patterns. The plurality of interconnect patterns may be used to configure a set of interconnects on one or more layers of a circuit board. The preferred interconnect pattern may provide a lower highest crosstalk than the highest crosstalk associated with each of the other interconnect patterns. Each interconnect pattern may be different from the other interconnect patterns. Each interconnect pattern may define a plurality of longitudinal slots including longitudinal slots occupied by the set of interconnects. The highest crosstalk for the each interconnect pattern may correspond to one of the longitudinal slots.

In an aspect of the disclosure, a semiconductor device comprises a chip carrier or a circuit board having one or more layers, and a plurality of longitudinal slots defined in at least one of the one or more layers, whereby the interconnect pattern is selected from a plurality of interconnect patterns when a maximum crosstalk power estimated or calculated for the interconnect pattern is lower than maximum crosstalk powers estimated or calculated for the other interconnect patterns. Each interconnect pattern may be different from the other interconnect patterns. Each interconnect pattern may define a plurality of longitudinal slots including longitudinal slots occupied by the set of interconnects. The highest crosstalk for the each interconnect pattern may correspond to one of the longitudinal slots.

DETAILED DESCRIPTION

Figure 1:
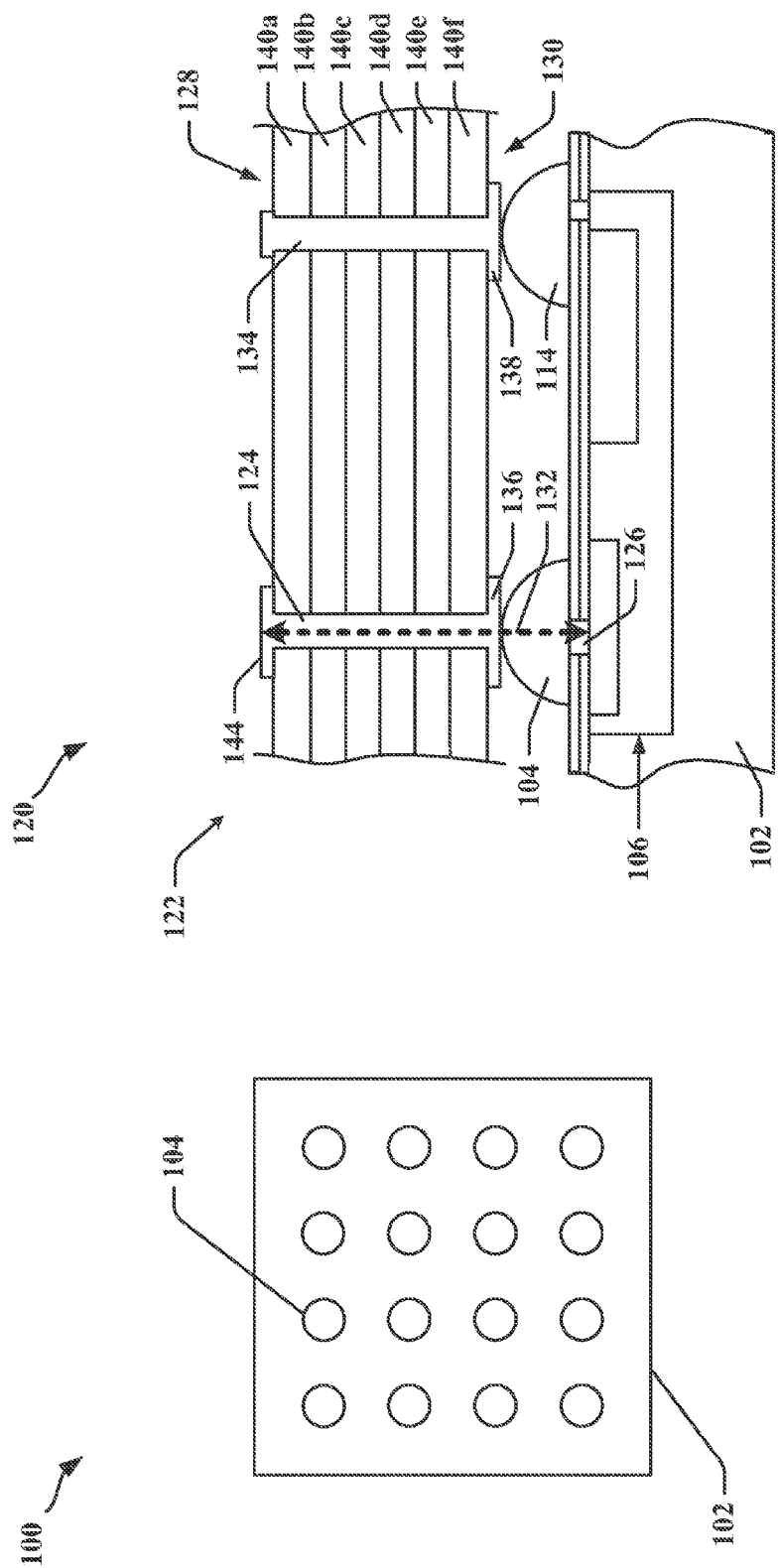
FIG. 1 illustrates a die and flip-chip assembly.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Several aspects of electrical assemblies, ICs, and IC packaging will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

As the demand for high performance devices implementing IC technology has increased so has the demand for increased functionality, speed, and portability of the devices. In connection with increasing performance and functionality of consumer electronics, maximum functional integration of the IC devices in an assembly having the smallest footprint, lowest profile, and lowest cost is desired. However, as functionality increases, the number of IC and passive electrical components in the assembly increases dramatically, thus threatening the objective of a smaller-sized assembly due to issues related to the frequencies, density and proximity of interconnecting signals within and between ICs. In one example, inductive and capacitive coupling between such higher density interconnects may be increased, leading to greater crosstalk between interconnecting signals. Crosstalk may be defined as any undesirable effect generated in a first interconnect or other circuit by transmission of a signal through a second interconnect or other circuit. Crosstalk is typically observed as a result of parasitic or stray capacitive, inductive, or conductive coupling from the first interconnect or circuit to the second interconnect or circuit.

In one example, interfaces associated with double data rate synchronous dynamic random-access memory (DDR SDRAM) devices commonly have bit widths that are multiples of 8 bits, including 16 bits, 32 bits, 64 bits, etc., and may support data rates that are at least double the data rates of core logic of the DDR SDRAM IC. The high data rates and demands for particular physical alignment of inputs and outputs (I/Os) create serious challenges to SDRAM designers and designers of other types of IC. Moreover, SDRAM devices typically have interfaces that are aligned with a desired physical assignment of I/O, and which may relate to a physical layout of a ball grid array (BGA), or copper pillar bumps of an IC. Examples of physical interfaces associated with SDRAM may be found on devices such as System-on-Chip (SoC) and Mobile Station Modem (MSM) integrated circuits. Such devices may include one or more processing subsystems and peripheral I/O such as radio transceivers, and may require large numbers of interface connections to external circuits. Accordingly, densities of interconnects associated with arrays of solder balls, bumps and pillars are continuously increasing while operating frequencies of the devices are also increasing.

FIG. 1 illustrates a die 100 and flip-chip assembly 120 used for interconnecting an integrated circuit 106 provided on the die 102 to external circuitry using solder bumps, balls or posts (collectively solder bumps 104 and/or 114) that have been deposited onto an upper surface of the die 102. Solder bumps 104, 114 may be formed during wafer processing to enable the die to be mounted to a circuit or chip carrier 122. A chip-carrier 122 may provide pads 136 and 138 on a first surface 130 to receive and bond the solder bumps 104 and 114. Chip-carrier 122 may provide pads 144 on a second surface 128 to connect the flip-chip assembly 120 to external circuitry (e.g., a circuit board or another chip or wafer). Chip-carrier 122 may provide electrical connections between two or more dice 102 mounted on the chip-carrier 122. Connections may be made through circuits provided on a first surface 130 or the second surface 128 of the chip-carrier 122. Surfaces 128 and 130 may have a conductive layer deposited thereon, and/or a plurality of conductive layers may be provided between a plurality of layers 140a-140f.

Chip carrier 122 may provide a plurality of layers 140a-140f, including conductive layers that form one or more circuits used for transmission of signals between devices, circuits and dice 102 mounted on the chip carrier 122 and/or external devices. In one example, chip-carrier 122 comprises a plurality of non-conductive layers 140a-140f, each non-conductive layer 140a-140f separating a pair of thin conductive layers sandwiched between adjacent non-conductive layers 140a-140f, and/or deposited on the surfaces of one or more non-conductive layers 140a-140f. In another example, layers 140a-140f comprise alternating layers of conducting and non-conducting materials that are interleaved to provide electrically isolative separation between conductive layers.

Vias 124, 134 may be provided through the chip-carrier 122 to connect circuitry and/or pads 144 on the second surface 128 to die 102 through pads 136, 138 and solder bumps 104, 114 on the first surface 130. Vias 124 and 134 may interconnect circuits provided on conductive layers within the plurality of layers 140a-140f. Vias 126 may also be provided on die 102 to solder bumps 104 to the integrated circuit 106 formed in one or more layers of a semiconductor substrate provided on die 102.

Figure 2:
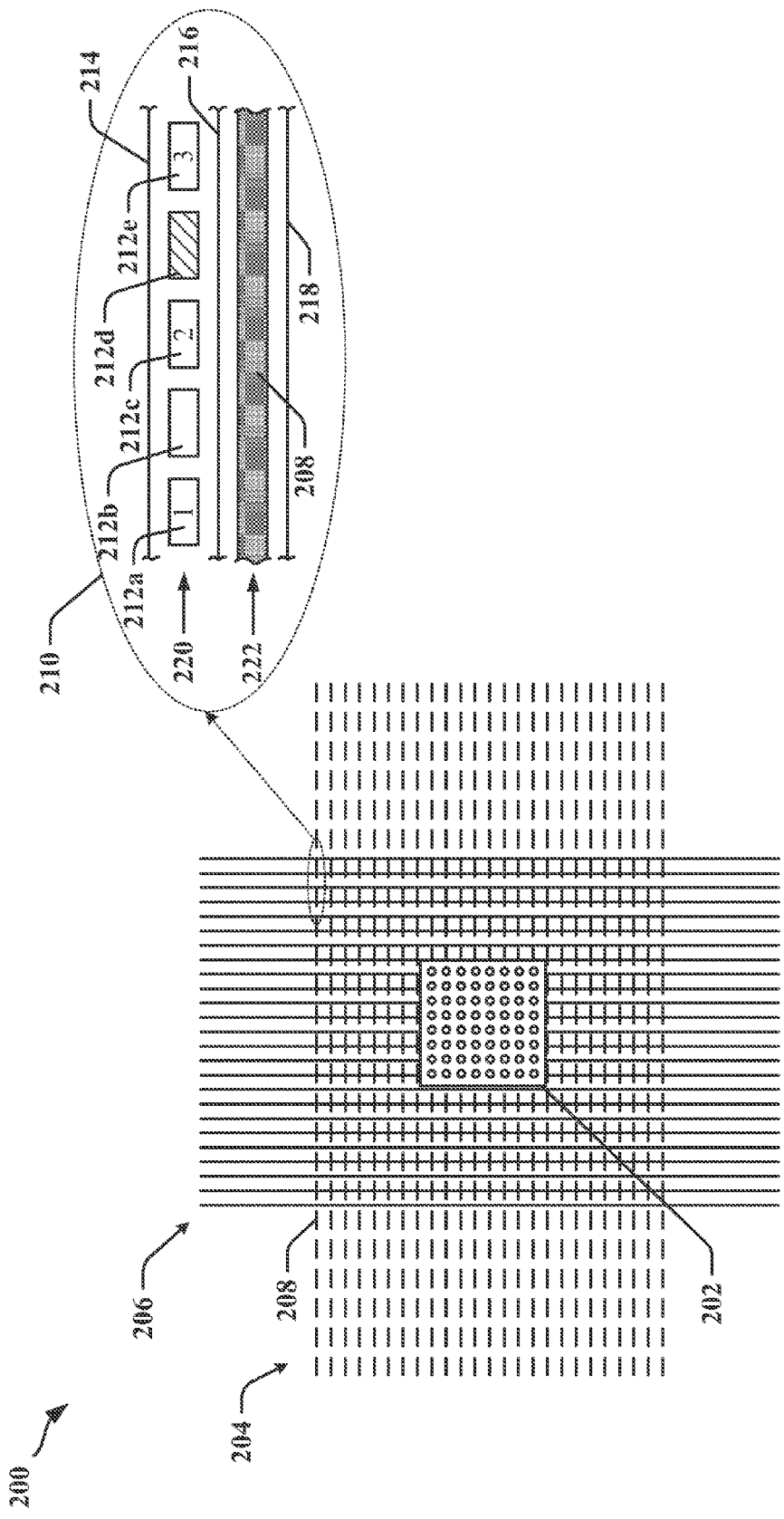
FIG. 2 is a diagram illustrating horizontal interconnections on a chip carrier.

FIG. 2 is a simplified diagram 200 illustrating an arrangement of horizontal interconnects on a circuit board or chip carrier 122. As can be seen from the cross-sectional view 210, two substantially orthogonal sets of horizontal interconnects 204 and 206 may be provided on two or more interconnect layers 220 and 222. The sets of interconnects 204 and 206 may connect one or more integrated circuit devices 202 with other circuits and devices. Interconnect layers 220 and 222 may be separated by insulating materials. Each interconnect layer 220 and 222 may be provided between conductive planes 214, 216 and 218. Planes 214, 216, 218 may carry system power, or be connected to ground and may be referred to as reference planes 214, 216, 218. The cross-sectional view 210 depicts a plurality of longitudinal interconnect slots 212a-212e that carry the set of interconnects 206 in a first interconnect layer 220, and a cross-section of one of a plurality of longitudinal slots that carry orthogonal interconnects 208 in a second interconnect layer 222. In the depicted example, longitudinal interconnect slots 212a, 212c and 212e are used for numerically designated signals (i.e. signals 1-3), longitudinal slot 212b carries an unused trace, strip or other transmission line, and gap slot 212d is left vacant.

In some embodiments, the sets of interconnects 204 and 206 may be formed and/or modeled using certain transmission line topologies, including microstrip and its variations, such as embedded microstrip. In some embodiments, the sets of interconnects 204 and 206 may be formed or modeled using stripline topologies and its variations, including asymmetrical stripline, dual stripline, edge coupled stripline and broadside coupled stripline. The maximum frequency ($F_{max}$) of signals transmitted through the sets of interconnects 204 and 206 may determine the topology adopted for interconnects 204 and 206, and may also influence the selection of patterns used to allocate signals to individual interconnects in the sets of interconnects 204 and 206. Patterns of interconnects may be developed that minimize crosstalk and other transmission line effects that can seriously affect signal integrity and achievable $F_{max}$.

Certain embodiments of the invention provide systems and methods for providing interconnect patterns that can optimize signal integrity and/or channel routing width, and that can identify and optimize bottleneck signal interconnects. The methods disclosed herein may employ one or more algorithms that optimize patterns of signal interconnects slots 212a, 212b, 212c, 212e and gap slots 212d to obtain a minimized crosstalk for a predefined number of signals and available gap slots 212d. Conventional interconnect patterns have typically been developed using intuitive insight and oversimplified rules based on generic signals, and conventional patterns often miss opportunities for performance improvement.

Algorithms disclosed herein permit optimization of a routing channel width on a device package and printed circuit board (PCB), and may thereby decrease the area, layer count and cost of the package or PCB. The selection of an interconnect pattern may be automated and a plurality of candidate patterns may be automatically selected from all possible patterns, enabling a circuit designer to eliminate manual, trial-and-error exploration of possible patterns.

Certain embodiments optimize interconnect layout in a pattern for a given number n of signal interconnects and a given number k of gap slots. Every possible configuration of the n signal interconnects and k gap slots may be identified and a set of patterns may be obtained. The set of patterns may include all possible patterns. According to certain aspects disclosed herein, the number of possible patterns is determinable as a number of ordered combinations of the n signal interconnects available using n+k slots. For example, when k=2, some patterns may be duplicative because the two gap slots and their effects are effectively identical in nature and effect, and one of two patterns may be eliminated when the patterns differ only because the two gap slots are transposed between the patterns. Similarly, certain interconnects may be treated as identical with respect to certain cross talk calculations when, for example, the interconnects are unused or carry low frequency signals, power or ground. In one example, a low-frequency signal may generate negligible crosstalk in a neighboring interconnect, although the low frequency interconnect may be afflicted by crosstalk generated by the neighboring interconnects.

Figure 3:
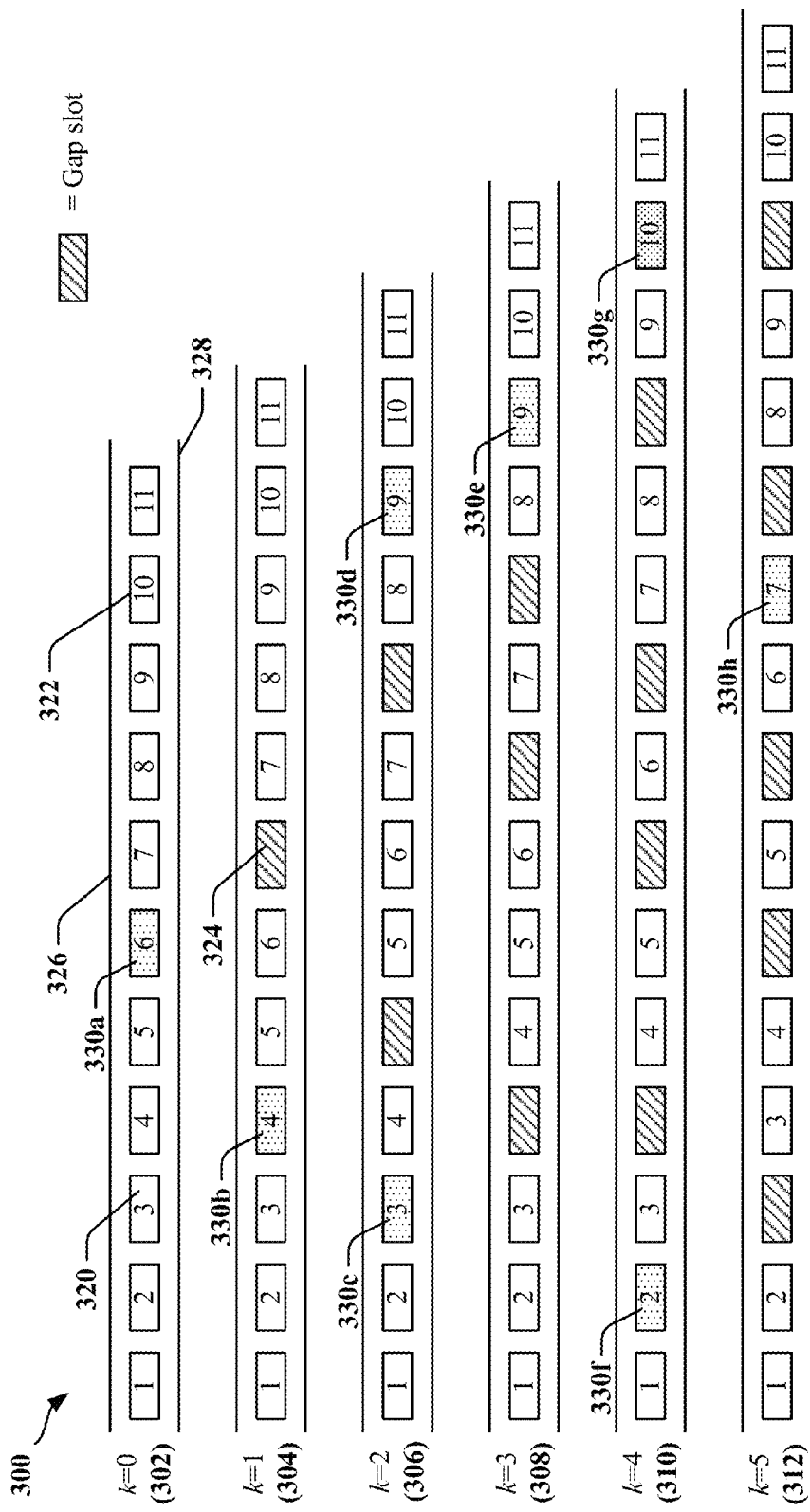
FIG. 3 is a diagram illustrating an example of cross-sectional patterns used for interconnect layout.

FIG. 3 is a schematic 300 illustrating interconnect patterns 302, 304, 306, 308, 310 and 312 for different values of k. In each instance, the pattern depicted is shown for illustrative purposes only, and other patterns may offer superior performance in some applications. Each pattern 302, 304, 306, 308, 310 and 312 defines n=11 numerically referenced longitudinal signal interconnect slots, including interconnect slots 320 and 322, for example. All 11 signal interconnects are disposed within a single layer, consistent with stripline transmission lines, in one example. Patterns 304, 306, 308, 310 and 312 are configured for a value of k that is non-zero, and each pattern 304, 306, 308, 310 and 312 defines k gap slots shown as hatched boxes (including gap slot 324) that are not available for signals. In some embodiments, no signal trace, strip or stripe is provided in gap slots 324. In some embodiments, an unconnected interconnect is provided in gap slot 324.

Figure 4:
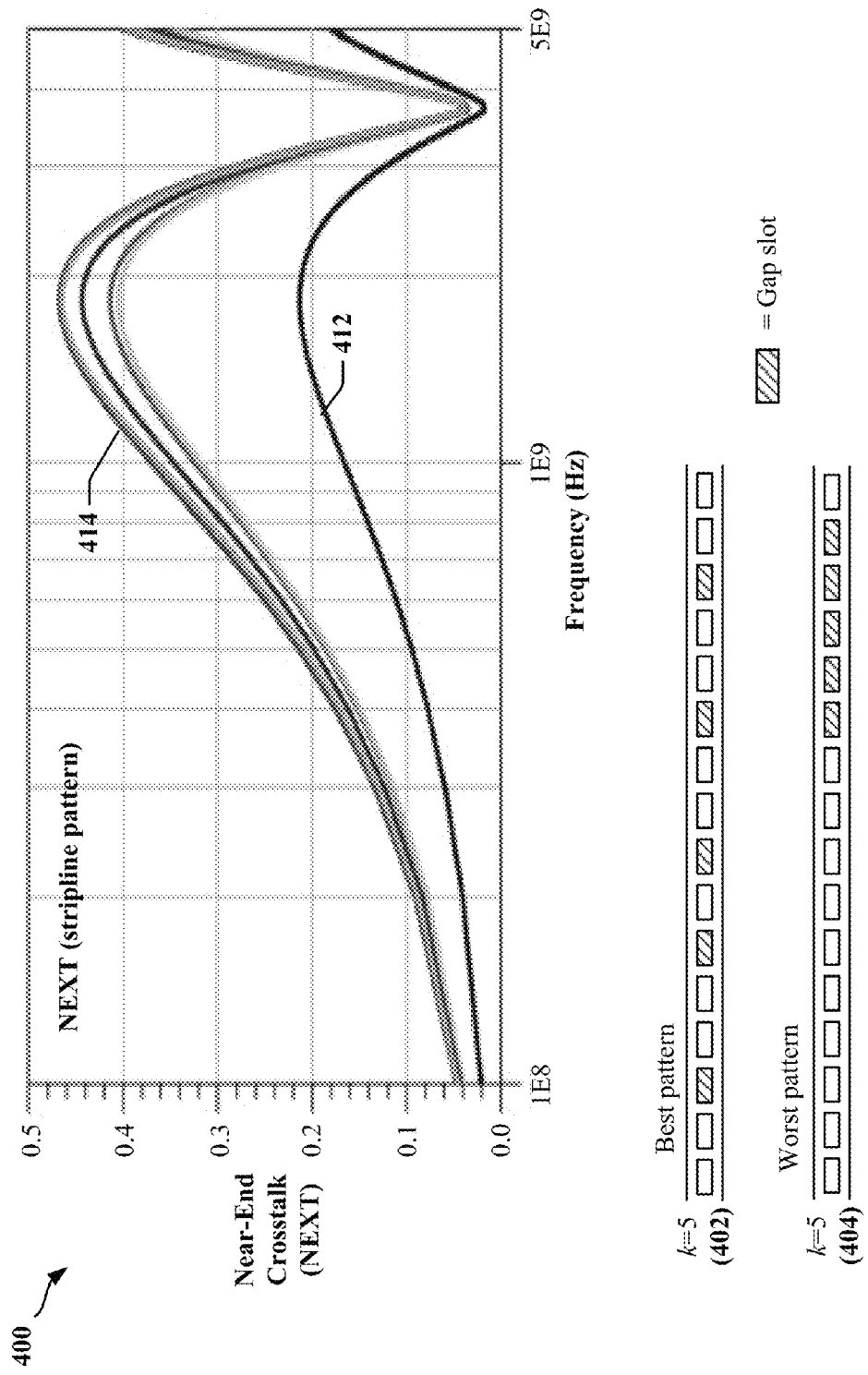
FIG. 4 is a chart representing near-end crosstalk for stripline patterns.
Figure 5:
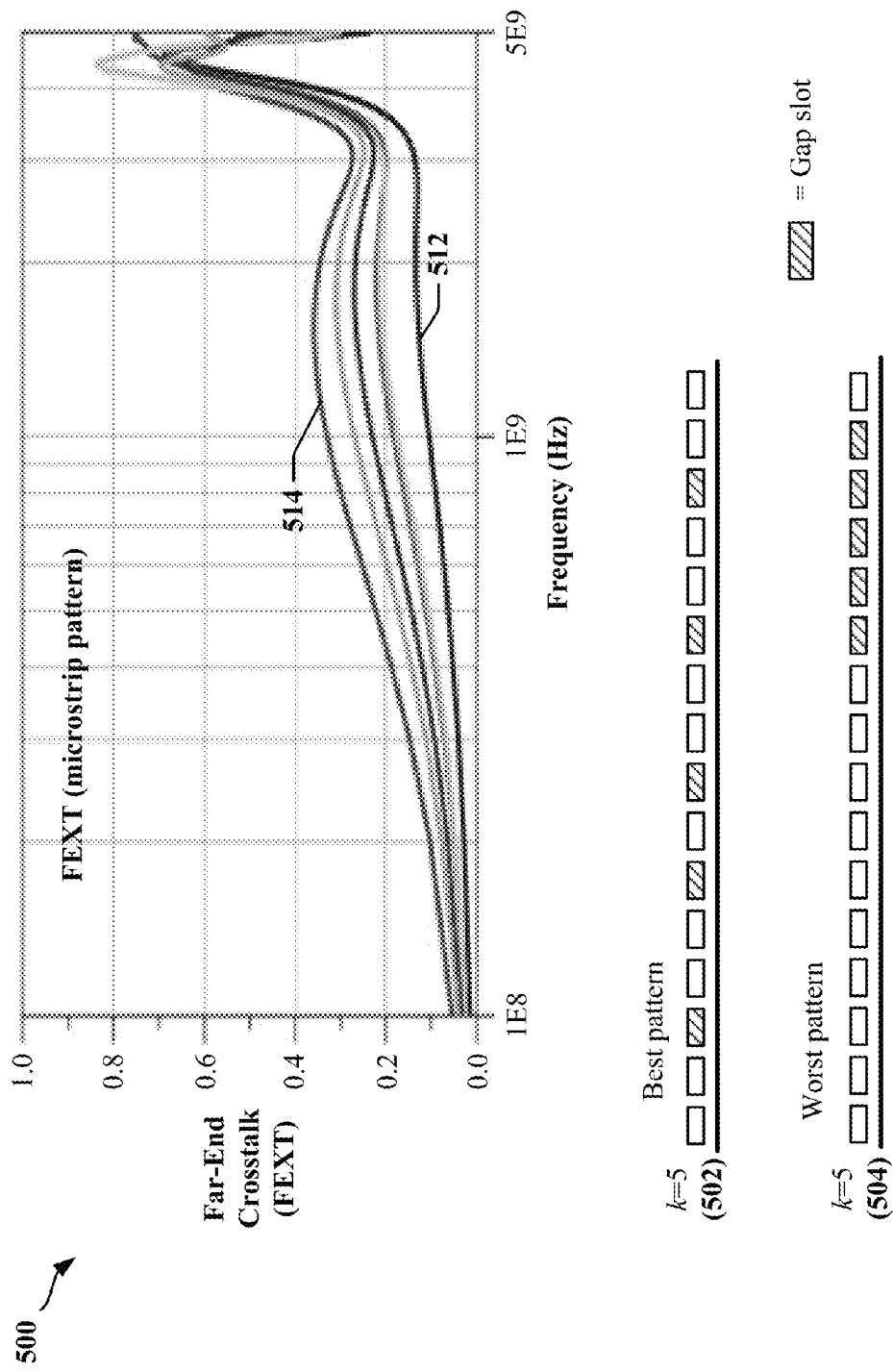
FIG. 5 is a chart representing far-end crosstalk for microstrip patterns.

In certain embodiments, at least one "bottleneck signal interconnect" 330a-330h is determined for each of a plurality of patterns 302, 304, 306, 308, 310 and/or 312. The plurality of patterns 302, 304, 306, 308, 310 and/or 312 may comprise all possible patterns for a given n and k. The bottleneck signal interconnect 330a-330h for each pattern may be an interconnect 320 which generates, or is afflicted by the highest crosstalk among all interconnects in the pattern 302, 304, 306, 308, 310 and/or 312. In one example, crosstalk is computed as far-end crosstalk (FEXT) for microstrip and dual stripline, including edge-coupled and broadside-coupled dual stripline. In another example, crosstalk is computed as near-end crosstalk (NEXT) for stripline. The crosstalk computation may be selected based on the most relevant or critical type of crosstalk for the type of interconnect and their respective interconnect patterns 302, 304, 306, 308, 310 and/or 312. FIG. 4 illustrates an example of NEXT for the bottleneck signal interconnect of a plurality of stripline patterns. The graph 400 illustrates NEXT measured across a range of frequencies of interest for multiple patterns. The best NEXT performance, depicted as the lowest NEXT curve 412, is obtained for a pattern 402. The worst NEXT performance is shown as NEXT curve 414, and is obtained for a pattern 404. FIG. 5 illustrates an example of FEXT for the bottleneck signal interconnect of a plurality of microstrip patterns. The graph 500 illustrates FEXT measured across a range of frequencies of interest for multiple patterns. The best FEXT performance is represented by curve 512, and is obtained for a pattern 502. The worst FEXT performance curve 514 corresponds to the pattern 504.

Crosstalk may be calculated or estimated by modeling the interconnects as microstrip, stripline, dual stripline, edge-coupled dual stripline, and/or broadside-coupled dual stripline transmission lines. Crosstalk may be calculated or estimated using physical attributes of the interconnects, such as length, and separation from neighboring interconnects and/or reference planes. An equivalent circuit of the modeled interconnect may be based on estimates of resistive, capacitive and inductive coupling between adjacent interconnects and between an interconnect and reference planes may be used to obtain an equivalent circuit. Crosstalk may be calculated or estimated based on the response of the equivalent circuit to one or more frequencies or bands of frequencies. Crosstalk may be expressed using one or more of a peak voltage or power level induced in an interconnect 320 or reference plane 326 or 328, and/or a ratio of peak-to-average noise power or voltage attributable to a bottleneck signal interconnect 330a-330h. In some embodiments, crosstalk may be characterized in a band of frequencies or in multiple bands of frequencies.

In certain embodiments, a preferred interconnect pattern is selected. The preferred interconnect pattern typically has a minimum highest crosstalk associated with its bottleneck signal interconnect 330a-330h than other interconnect patterns. That is, the interconnect pattern which minimizes the crosstalk in the bottleneck signal interconnect 330a-330h is typically selected. In some embodiments, a pattern 306 and/or 310 may yield two or more bottleneck signal interconnects 330c, 330d and/or 330f, 330g respectively, that exhibit substantially equal crosstalk. In these examples, either interconnect 330c or 330d may be randomly selected as a bottleneck signal interconnect for pattern 306, and either interconnect 330f or 330g may be randomly selected as a bottleneck signal interconnect for pattern 310. In certain embodiments, a preferred interconnect pattern is selected, based on crosstalk performance with respect to one or more thresholds.

Figure 6:
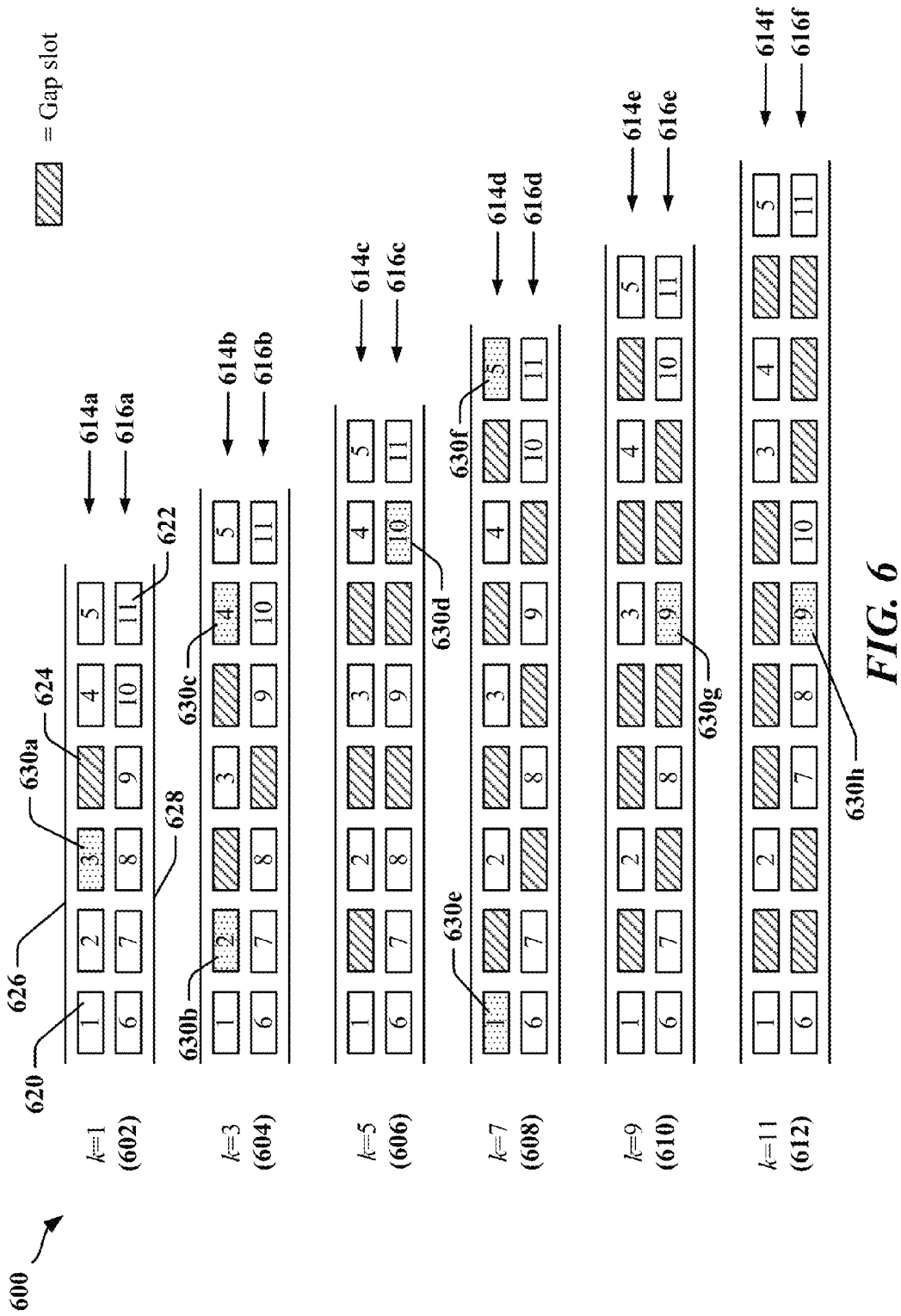
FIG. 6 is a diagram illustrating an example of cross-sectional patterns used for a multi-layer interconnect layout.

FIG. 6 is a schematic 600 illustrating interconnect patterns 602, 604, 606, 608, 610 and 612 for different values of k. In each instance, the pattern depicted is shown for illustrative purposes only, and other patterns may offer superior performance in some applications. Each pattern 602, 604, 606, 608, 610 and 612 defines n=11 numerically-referenced longitudinal interconnect slots (including slots or interconnects 620 and 622 for example) of the 11 slots allocated for high-frequency interconnect signals. Each pattern 602, 604, 606, 608, 610 and 612 is configured for a different non-zero value of k, and each pattern 602, 604, 606, 608, 610 and 612 defines k gap slots that are not available for signals, shown here as hatched boxes and including gap slot 624. In some embodiments, no signal trace, strip or stripe is provided in gap slot 624. In some embodiments, an unconnected interconnect is provided in gap slot 624.

The k gap slots 624 and n signal interconnects 620 are divided between a top layer or plane 614a-614f and a bottom layer or plane 616a-616f. The number of the k gap slots 624 and n interconnects 620 in each layer may be arbitrarily determined. In some embodiments, patterns considered for crosstalk optimization may include all possible patterns, including patterns that correspond to different splits of the k gap slots 624 and n signal interconnects 620 between the layers. In FIG. 6, each example pattern 602, 604, 606, 608, 610 and 612 has 5 interconnects in the upper layer 614a-614f and 6 interconnects in the lower layer 616a-616f. In some embodiments, the gap slots 624 may be considered as identical with regard to crosstalk, and certain duplicative patterns may be eliminated from consideration. For example, two patterns may be considered duplicative if all signal interconnects 620 are located in the same longitudinal slots in the two patterns. The latter situation may occur when patterns differ only because the locations of two or more gap slots are exchanged between the patterns.

As discussed herein, one or more bottleneck signal interconnects 630a-630g estimated or calculated for each pattern 602, 604, 606, 608, 610 and 612 may be an interconnect 630a-630g which generates, or is afflicted by the highest crosstalk among all interconnects 624, 622 in the pattern 602, 604, 606, 608, 610 and 612. An interconnect pattern selected for use on a device may have a minimum highest crosstalk associated with its bottleneck signal interconnect 616a-616f.

Figure 7:
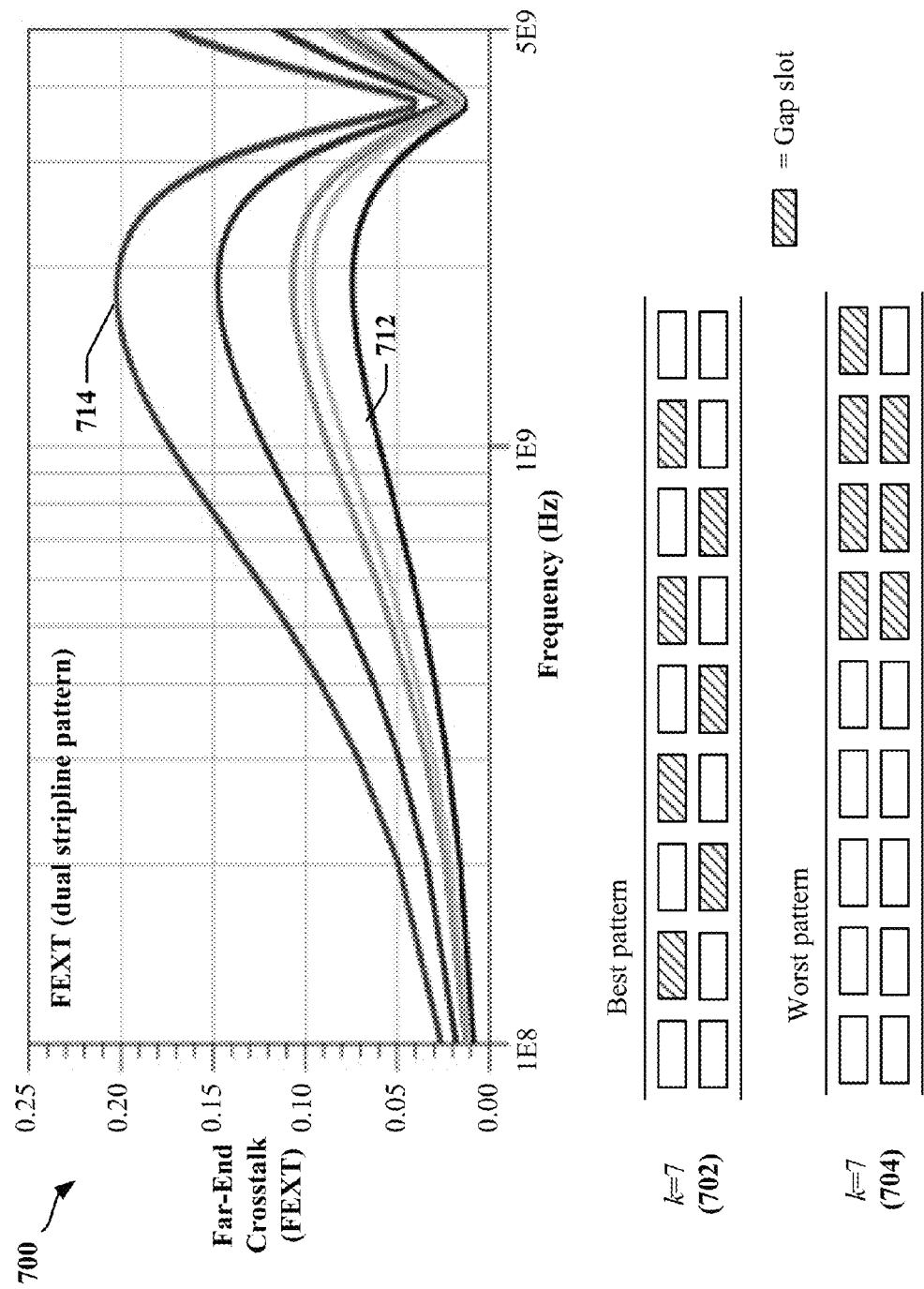
FIG. 7 is a chart representing far-end crosstalk for dual-stripline patterns.

FIG. 7 includes a graph 700 that illustrates an example of FEXT for the bottleneck signal interconnect of a plurality of dual stripline patterns. The graph 700 illustrates FEXT measured across a range of frequencies of interest for multiple patterns. The best FEXT performance is represented by the curve 712, and is obtained for a pattern 702. The worst FEXT performance curve 714 corresponds to the pattern 704.

Crosstalk may be calculated using a simplified model, in which transmission lines are characterized as rectangular interconnects that behave as transmission lines. In some embodiments, the model may assume that the interconnects are provided between two infinite planes, formed by power and ground supplies, for example, and such that inductive coupling between interconnects is dominant. Certain embodiments employ more sophisticated transmission line models that can account for changes in direction of the interconnects, different cross-sectional profiles of the interconnects, and/or imperfect reference planes.

In some embodiments, one or more interconnect patterns 302, 304, 306, 308, 310, 312, 602, 604, 606, 608, 610 and/or 612 may be considered for use in a chip carrier based on an optimization that includes calculations of interactions with other interconnect planes and vertical interconnects between planes. Some tradeoff may be required to obtain optimized horizontal and vertical interconnects. For example, a horizontal interconnect pattern may dictate locations for placement of one or more vias, and their corresponding vertical interconnects, and may eliminate a best or optimal vertical interconnect pattern from use on the chip carrier.

Figure 8:
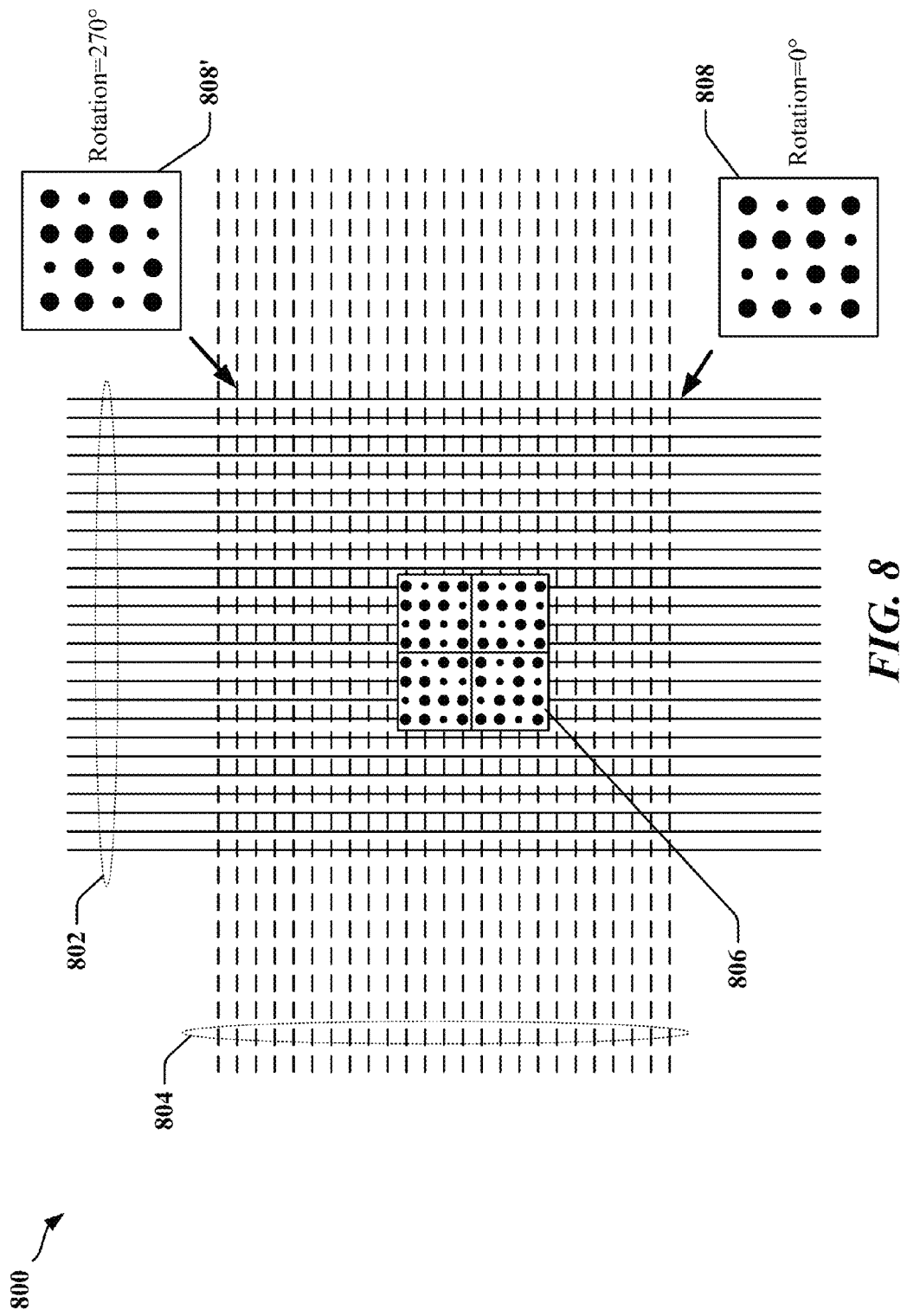
FIG. 8 illustrates the formation of horizontal interconnects in the presence of vertical interconnects.

With reference to FIG. 8, crosstalk may be further optimized by considering interactions between horizontal interconnects 802 and 804 and vertical interconnects 806. The vertical interconnects 806 may be formed in accordance with one or more optimized patterns 808 and 808'. While a plurality of patterns may be employed in an arrangement of vertical interconnects, a single base pattern 808 is used in the example depicted in FIG. 8. Pattern 808' is a rotated version of the base pattern 808. The pattern 808' may be rotated or mirrored to minimize crosstalk between sets of vertical interconnects and, in the example, vertical interconnects 806 may be formed using three instances of pattern 808 and one instance of the rotated/mirrored pattern 808'. In some examples, the pattern 808' may comprise a different base pattern instead of a mirrored or rotated copy of the base pattern 808.

The vertical interconnects 806 may be located in close proximity to certain of the horizontal interconnects 802 and 804, and some of the vertical interconnects 806 may be connected to a corresponding horizontal interconnects 802 and 804. Crosstalk may occur between vertical interconnects 806 and horizontal interconnects 802 and 804. Accordingly, certain embodiments may optimize the arrangement of vertical interconnects 806 with respect to the horizontal interconnects 802 and 804, and vice versa, for use in a chip carrier, circuit board, substrate, or the like. Optimization may be performed based on calculations of electromagnetic interactions between vertical interconnects 806 and intersecting or proximately located horizontal interconnects 802 and 804.

Figure 9:
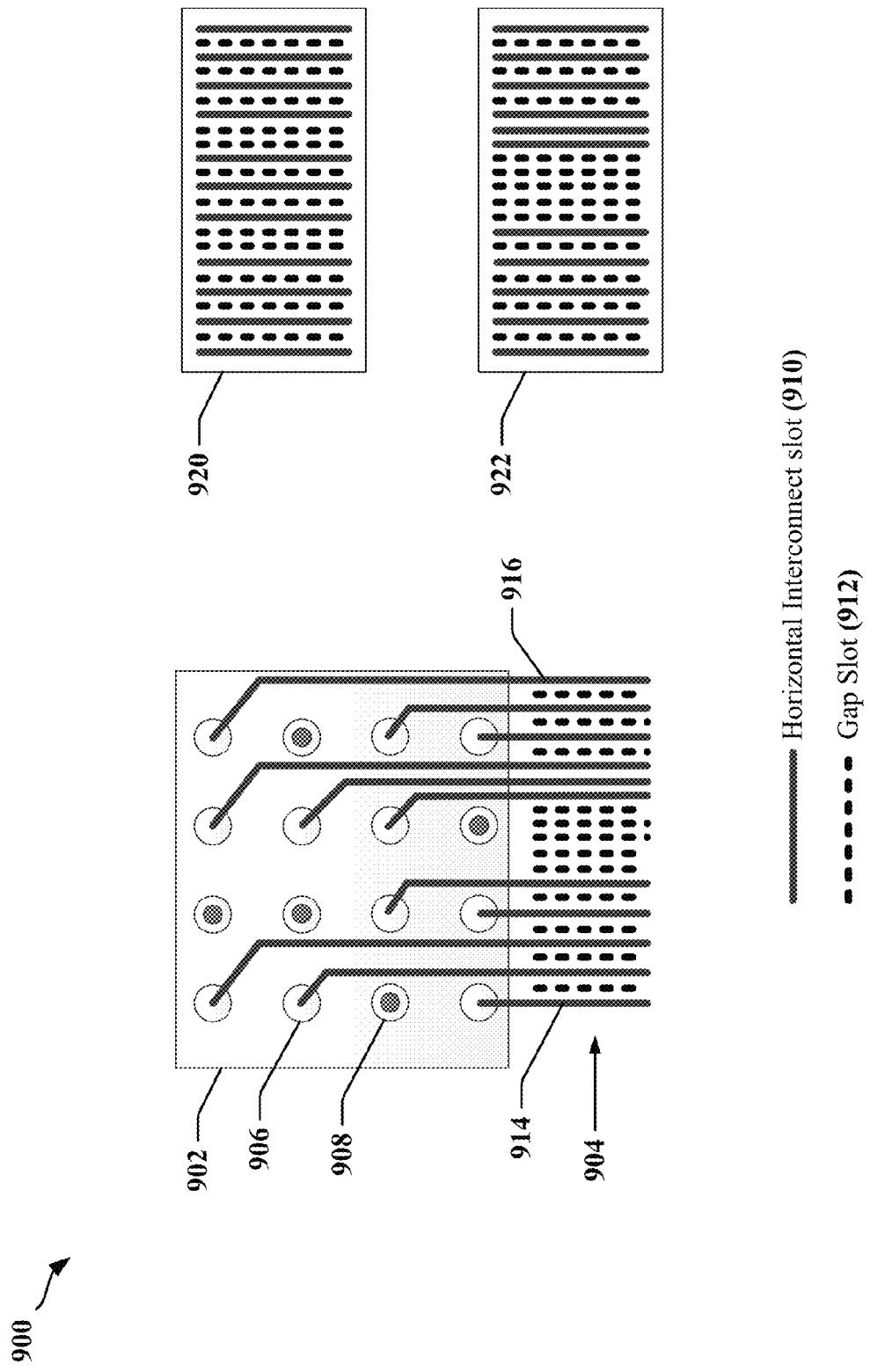
FIG. 9 illustrates signal fan-out from vertical interconnects.

FIG. 9 is a schematic diagram 900 illustrating the use of horizontal interconnects 904 on a layer of a substrate, circuit board, chip-carrier or the like. The horizontal interconnects 904 may include one or more horizontal interconnect slots 910 and one or more gap slots 912, according to certain aspects described herein. The horizontal interconnect slots 910 may include signal conductors that carry signals to and from a set of vertical interconnects 902. The one or more gap slots 912 may include unused traces, an insulator, or may be vacant interconnect positions. The set of vertical interconnects 902 may be associated with an integrated circuit or connector, for example. The set of vertical interconnects 902 may include interconnects such as vertical interconnect 906 that carries a signal between devices and/or connectors. The set of vertical interconnects 902 may include one or more power, ground and or other vertical interconnects 908 that may not connected on the illustrated layer.

An optimal horizontal interconnect pattern 920 may be determined using a horizontal interconnect optimization algorithm according to certain aspects described herein. In the example, the optimal horizontal interconnect pattern 920 may be determined for microstrip horizontal interconnects and may provide for 11 signals with 12 gap slots. The set of vertical interconnects 902 may be formed in accordance with an optimized vertical interconnect pattern. In the example of FIG. 9, the horizontal interconnects 904 may be used to fan out 11 signals from the vertical interconnects 902. Power and ground signals may be connected to one or more different layers using vias 908. In some instances, the ideal horizontal interconnect pattern 920 may not be physically or electromagnetically compatible with the optimal vertical interconnect pattern used to form vertical interconnects 902, and a non-optimal horizontal interconnect pattern 922 may be used to fan-out the 11 signals from the vertical interconnects 902.

The specific location of the signals, power and ground in the optimized set of vertical interconnects 902 may dictate, to some degree, the location of the horizontal interconnect slots 910 and/or gap slots 912. The configuration and number of signals to be carried in the set of vertical interconnects 902 results in 12 gap slots 912 remaining between outer horizontal interconnects 914 and 916 (as indicated by broken lines). The placement of the horizontal interconnect slots 910 may generate crosstalk between horizontal interconnects 904 and/or between horizontal interconnects 904 and vertical interconnects 902. The placement of gap slots 912 and/or horizontal interconnect slots 910 may conflict with an optimum horizontal interconnect pattern 920 selected for the set of horizontal interconnects 904 or for the horizontal interconnects 904. Accordingly, a previously selected arrangement of horizontal interconnect slots 910 and gap slots 912 and/or vertical interconnects 902 may not be achievable.

Tradeoffs and/or co-optimizations may be employed to obtain an optimized combination of horizontal interconnects 904 and vertical interconnects 902 across one or more planes. In one example, a vertical interconnect pattern may be used that causes one or more vias and/or vertical interconnects 902 to be be placed at locations that preclude the use of an optimum horizontal interconnect pattern 920 and may result in the use of a less than optimum or non-optimal horizontal interconnect pattern 922 for forming horizontal interconnects 904 on the chip carrier, circuit board, substrate, etc. In another example, the use of an optimum horizontal interconnect pattern 920 may restrict the location at which one or more vias and corresponding vertical interconnects can be placed, and may eliminate an optimum vertical interconnect pattern from consideration for use on the chip carrier, circuit board, substrate, etc. In such cases, a co-optimization process may be used to consider different combinations of vertical and horizontal interconnect patterns.

A combination of horizontal and vertical patterns may be selected that results in the lowest amount of crosstalk in one or more bottleneck interconnects, which may include vertical and/or horizontal interconnects. In one example, the horizontal interconnect may be the source of the majority of system crosstalk issues and, the best horizontal interconnect pattern may be selected before a compatible associated vertical interconnect pattern is selected. In another example, the vertical interconnect may be the source of a majority of the system crosstalk, in which case the best vertical interconnect pattern may be selected first, and an associated horizontal interconnect pattern compatible with the chosen vertical interconnect pattern may then be selected.

Referring again to FIG. 1, one or more of vias 124, 126 and solder bump 104 may be substantially in vertical alignment, thereby forming a vertical interconnect 132, represented as line. The relative contributions of vias 124, 126 and solder bump 104 to the physical length of the vertical interconnect 132 may vary with application. Capacitive, inductive and/or resistive coupling between adjacent vertical interconnects and horizontal interconnects can introduce crosstalk between circuits within the flip-chip assembly 120.

In an aspect of the disclosure, a method, a system and an algorithm are provided that may be employed to optimize interconnect patterns in order to minimize crosstalk for an arbitrary number of signals and power/ground interconnects in semiconductor devices.

Figure 10:
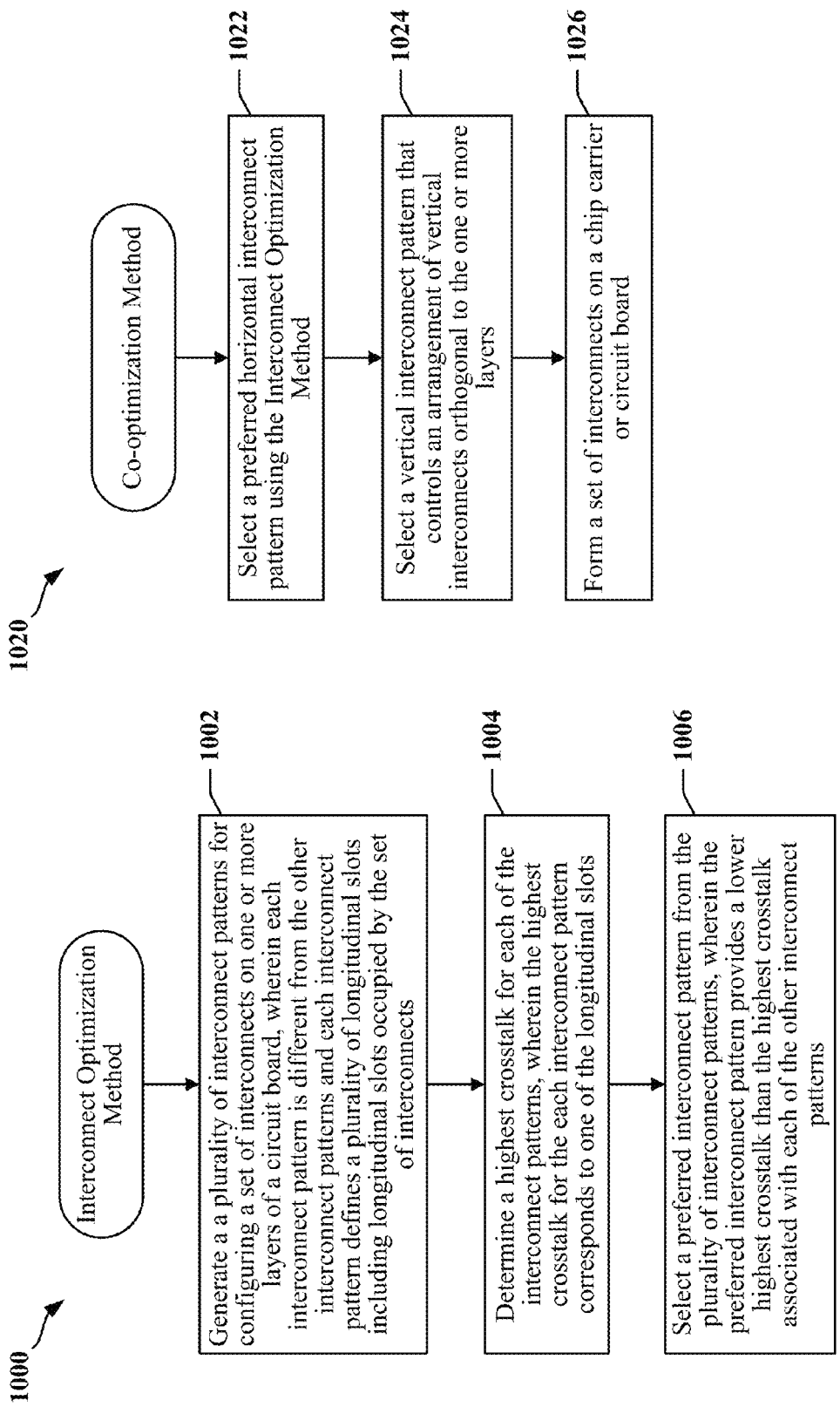
FIG. 10 is a flowchart of a method for optimizing an interconnect pattern to reduce crosstalk.

FIG. 10 includes a flowchart 1000 illustrating a method for optimizing interconnects in a semiconductor device. At step 1002, a plurality of interconnect patterns is generated for configuring a set of interconnects to be formed on one or more layers of a circuit board, substrate or chip carrier. Each interconnect pattern may be different from the other interconnect patterns. Each interconnect pattern may define a plurality of longitudinal slots, including longitudinal slots occupied by the set of interconnects. The plurality of longitudinal slots may comprise at least one unoccupied longitudinal slot. For example, two interconnect patterns may be different from one another only when the two interconnect patterns assign at least one interconnect to different longitudinal slots.

In some embodiments, the plurality of interconnect patterns defines pluralities of longitudinal slots on at least two substantially parallel planes within the one or more layers of the circuit board. The at least two substantially parallel planes may be provided between two substantially parallel reference planes.

At step 1004, a highest crosstalk is determined for each of the interconnect patterns. The highest crosstalk for each interconnect pattern may correspond to one of the longitudinal slots. In one example, the highest crosstalk for the each interconnect pattern may correspond to the highest crosstalk afflicting one of the longitudinal slots. In another example, the highest crosstalk for each interconnect pattern corresponds to the highest crosstalk generated by an interconnect occupying one of the longitudinal slots. The highest crosstalk for each of the interconnect patterns may be determined for a plurality of frequencies. The highest crosstalk for each of the interconnect patterns may be determined for a range of frequencies.

According to certain aspects described herein, the highest crosstalk for each of the interconnect patterns may be determined by modeling the set of interconnects as microstrip or dual stripline transmission lines. The highest crosstalk for each interconnect pattern may comprise far-end crosstalk. The highest crosstalk for each of the interconnect patterns may be determined by modeling the set of interconnects as stripline transmission lines. The highest crosstalk for each interconnect pattern may comprise near-end crosstalk.

At step 1006, a preferred interconnect pattern is selected from the plurality of interconnect patterns. The preferred interconnect pattern may provide a lower highest crosstalk than the highest crosstalk associated with each of the other interconnect patterns.

FIG. 10 includes a flowchart 1020 illustrating a method for co-optimizing vertical and horizontal interconnects in a semiconductor device. At step 1022, a preferred horizontal interconnect pattern is selected using the optimization method illustrated in the flowchart 1000.

At step 1024, a vertical interconnect pattern is selected. The vertical interconnect pattern may control an arrangement of vertical interconnects orthogonal to one or more layers on a substrate, circuit board or chip carrier. A combination of the preferred interconnect pattern and the vertical interconnect pattern may be selected that is calculated to provide a lower highest crosstalk associated with the combination than the highest crosstalk associated with other combinations of horizontal and vertical interconnect patterns. The highest crosstalk associated with the combination may relate to crosstalk associated with one of a vertical interconnect or a horizontal interconnect.

At step 1026, a set of interconnects may be formed on a chip carrier or circuit board in accordance with the preferred interconnect pattern.

Figure 11:
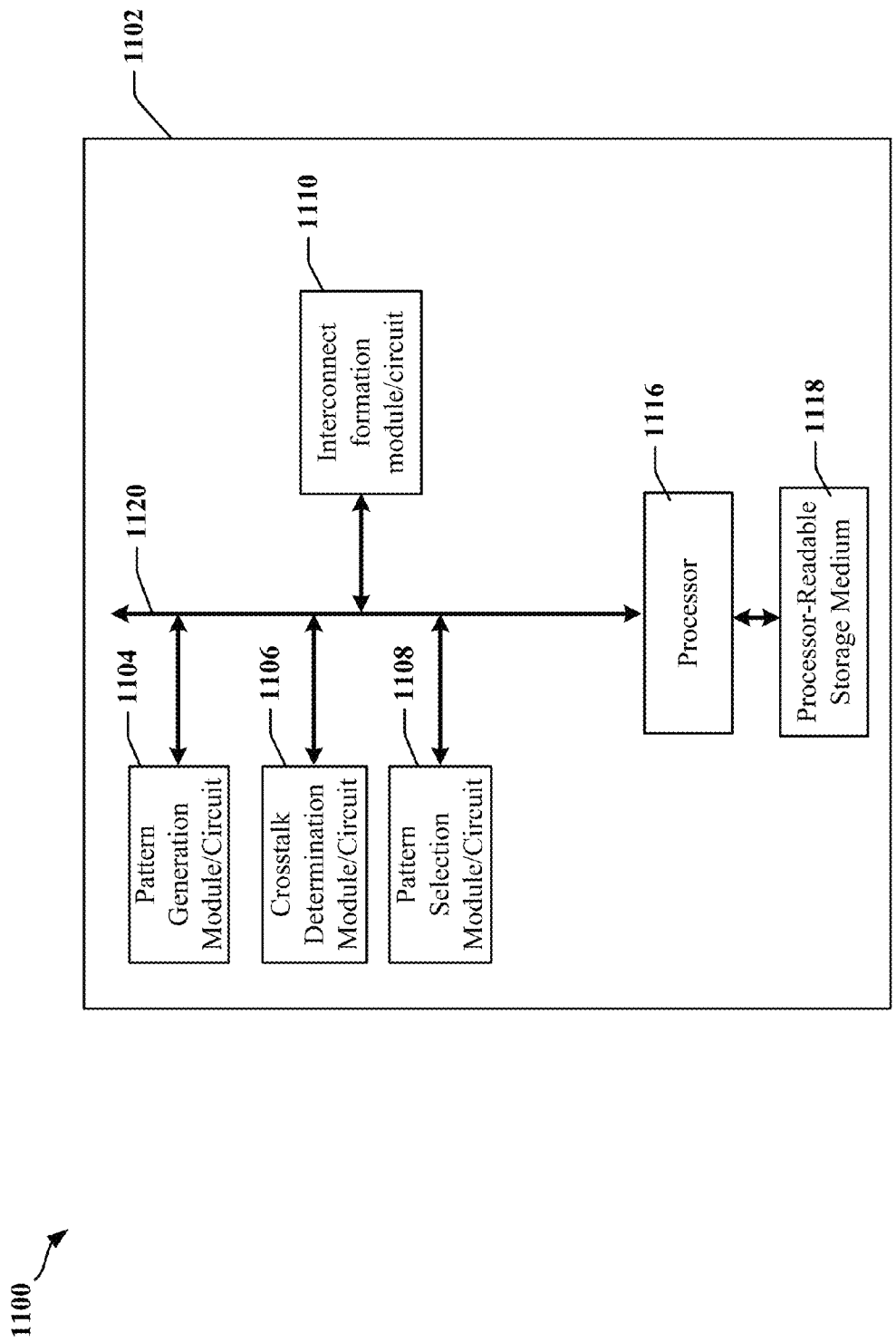
FIG. 11 is a block diagram of a system for optimizing an interconnect pattern to reduce crosstalk.

FIG. 11 is a conceptual block diagram illustrating an example of a hardware implementation for an apparatus 1100 employing a processing circuit 1102. The processing circuit 1102 may be implemented using a bus architecture, represented generally by the bus 1120. The bus 1120 may include any number of interconnecting buses and bridges depending on the specific application of the processing system 1102 and the overall design constraints. The bus 1120 links together various circuits including one or more processing devices and/or hardware modules, represented by the processor 1116, the modules 1104, 1106, 1108, 1110, and the processor-readable storage medium 1118. The bus 1120 may also link various other circuits such as timing sources, peripherals, voltage regulators, and power management circuits, which are well known in the art, and therefore, will not be described any further.

The processing circuit 1102 includes a processor 1116 coupled to a processor-readable storage medium 1118. The processor 1116 is responsible for general processing, including the execution of software stored on the processor-readable storage medium 1118. The software, when executed by the processor 1116, causes the processing circuit 1102 to perform the various functions described supra for any particular apparatus 1100. The processor-readable storage medium 1118 may also be used for storing data that is manipulated by the processor 1116 when executing software. The processing circuit 1102 further includes at least one of the modules 1104, 1106, 1108 and 1110. The modules 1104, 1106, 1108 and 1110 may comprise software modules executed by the processor 1116, resident/stored in the processor-readable storage medium 1118, one or more hardware modules coupled to the processor 1116, or some combination thereof.

In one configuration, an apparatus 1100 for wireless communication includes means 1104 for generating a plurality of interconnect patterns, means 1106 for determining a highest crosstalk for each of the interconnect patterns, means 1108 for selecting a preferred interconnect pattern from the plurality of interconnect patterns, and means 1110 for forming or causing to be formed a set of interconnects set of interconnects on a chip carrier or circuit board in accordance with the preferred interconnect pattern. The plurality of interconnect patterns may be used for configuring a set of interconnects on one or more layers of a circuit board, substrate or chip carrier. The preferred interconnect pattern may provide a lower highest crosstalk than the highest crosstalk associated with each of the other interconnect patterns. The preferred interconnect pattern may be used by the means 1110 to generate a configuration of interconnects to be formed on the one or more layers of a circuit board, substrate or chip carrier.

The aforementioned means may be one or more of the aforementioned modules of the apparatus 1100 and/or the processing circuit 1102 configured to perform the functions recited by the aforementioned means.

The terms wafer and substrate may be used herein to include any structure having an exposed surface with which to form an IC according to aspects of the present disclosure. The term "die" may be used herein to include an IC. A die may include one or more circuits. The term substrate is understood to include semiconductor wafers. The term substrate is also used to refer to semiconductor structures during fabrication, and may include other layers that have been fabricated thereupon. The term substrate includes doped and undoped semiconductors, epitaxial semiconductor layers supported by a base semiconductor, or semiconductor layers supported by an insulator, as well as other semiconductor structures well known to one skilled in the art.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 6, 8, 9 and 11 may be configured to perform one or more of the methods, features, or steps described herein, including as illustrated in the methods illustrated in FIG. 10. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM, flash memory, ROM, erasable programmable-ROM (EPROM), electrically erasable programmable-ROM (EEPROM), registers, hard disk, a removable disk, a compact Disk ROM (CD-ROM), or any other form of storage medium known in the art. A storage medium may be coupled to the processor such that the processor can read information from, and write information to, the storage medium. In the alternative, the storage medium may be integral to the processor.

Software may include instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for optimizing interconnects in a semiconductor device, comprising:

generating a plurality of interconnect patterns for configuring a set of interconnects on one or more layers of a circuit board, wherein each interconnect pattern is different from the other interconnect patterns and each interconnect pattern defines a plurality of longitudinal slots including longitudinal slots occupied by the set of interconnects;

determining a highest crosstalk for each of the interconnect patterns, wherein the highest crosstalk for the each interconnect pattern corresponds to one of the longitudinal slots; and selecting a preferred interconnect pattern from the plurality of interconnect patterns, wherein the preferred interconnect pattern provides a lower highest crosstalk than the highest crosstalk associated with each of the other interconnect patterns.

2. The method of claim 1, wherein the plurality of longitudinal slots comprises at least one unoccupied longitudinal slot.

3. The method of claim 2, wherein the plurality of interconnect patterns defines pluralities of longitudinal slots on at least two substantially parallel planes within the one or more layers of the circuit board.

4. The method of claim 3, wherein the at least two substantially parallel planes are provided between two substantially parallel reference planes.

5. The method of claim 2, wherein two interconnect patterns are different from one another only when the two interconnect patterns assign at least one interconnect to different longitudinal slots.

6. The method of claim 1, wherein the highest crosstalk for the each interconnect pattern corresponds to the highest crosstalk afflicting one of the longitudinal slots.

7. The method of claim 1, wherein the highest crosstalk for the each interconnect pattern corresponds to the highest crosstalk generated by an interconnect occupying one of the longitudinal slots.

8. The method of claim 1, wherein determining the highest crosstalk for each of the interconnect patterns includes:
modeling the set of interconnects as microstrip or dual stripline transmission lines.

9. The method of claim 8, wherein the highest crosstalk for the each interconnect pattern comprises far-end crosstalk.

10. The method of claim 1, wherein determining the highest crosstalk for each of the interconnect patterns includes:
modeling the set of interconnects as stripline transmission lines.

11. The method of claim 10, wherein the highest crosstalk for the each interconnect pattern comprises near-end crosstalk.

12. The method of claim 1, wherein the highest crosstalk for each of the interconnect patterns is determined for a plurality of frequencies.

13. The method of claim 1, wherein the highest crosstalk for each of the interconnect patterns is determined for a range of frequencies.

14. The method of claim 1, further comprising:
forming a set of interconnects on a chip carrier or circuit board in accordance with the preferred interconnect pattern.

15. The method of claim 14, wherein selecting the preferred interconnect pattern includes:
selecting a vertical interconnect pattern that controls an arrangement of vertical interconnects orthogonal to the one or more layers, wherein a combination of the preferred interconnect pattern and the vertical interconnect pattern is calculated to provide a lower highest crosstalk associated with the combination than the highest crosstalk associated with other combinations of horizontal and vertical interconnect patterns.

16. The method of claim 15, wherein the highest crosstalk associated with the combination relates to crosstalk associated with one of a vertical interconnect or a horizontal interconnect.

17. An apparatus for optimizing interconnect patterns in a semiconductor device, comprising:
a processing system configured to:
generate a plurality of interconnect patterns for configuring a set of interconnects on one or more layers of a circuit board, wherein each interconnect pattern is different from the other interconnect patterns and defines a plurality of longitudinal slots including longitudinal slots occupied by the set of interconnects;
determine a highest crosstalk for each of the interconnect patterns, wherein the highest crosstalk for the each interconnect pattern corresponds to one of the longitudinal slots; and
select a preferred interconnect pattern from the plurality of interconnect patterns, wherein the preferred interconnect pattern provides a lower highest crosstalk than the highest crosstalk associated with each of the other interconnect patterns; and
a processor readable storage medium.

18. The apparatus of claim 17, wherein the plurality of longitudinal slots comprises at least one unoccupied longitudinal slot.

19. The apparatus of claim 18, wherein the plurality of interconnect patterns defines pluralities of longitudinal slots on at least two substantially parallel planes within the one or more layers of the circuit board.

20. The apparatus of claim 19, wherein the at least two substantially parallel planes are provided between two substantially parallel reference planes.

21. The apparatus of claim 18, wherein two interconnect patterns are different from one another only when the two interconnect patterns assign at least one interconnect to different longitudinal slots.

22. The apparatus of claim 17, wherein the highest crosstalk for the each interconnect pattern corresponds to the highest crosstalk afflicting one of the longitudinal slots.

23. The apparatus of claim 17, wherein the highest crosstalk for the each interconnect pattern corresponds to the highest crosstalk generated by an interconnect occupying one of the longitudinal slots.

24. The apparatus of claim 17, wherein the processing system is configured to determine the highest crosstalk for each of the interconnect patterns by modeling the set of interconnects as microstrip or dual stripline transmission lines.

25. The apparatus of claim 24, wherein the highest crosstalk for the each interconnect pattern comprises far-end crosstalk.

26. The apparatus of claim 17, wherein the processing system is configured to determine the highest crosstalk for each of the interconnect patterns by modeling the set of interconnects as stripline transmission lines.

27. The apparatus of claim 26, wherein the highest crosstalk for the each interconnect pattern comprises near-end crosstalk.

28. The apparatus of claim 17, wherein the highest crosstalk for each of the interconnect patterns is determined for a plurality of frequencies.

29. The apparatus of claim 17, wherein the highest crosstalk for each of the interconnect patterns is determined for a range of frequencies.

30. The apparatus of claim 17, wherein the processing system is configured to:
cause a set of interconnects to be formed on a chip carrier or circuit board in accordance with the preferred interconnect pattern.

31. The apparatus of claim 30, wherein the processing system is configured to:
select a vertical interconnect pattern that controls an arrangement of vertical interconnects orthogonal to the one or more layers, wherein a combination of the preferred interconnect pattern and the vertical interconnect pattern is calculated to provide a lower highest crosstalk associated with the combination than the highest crosstalk associated with other combinations of horizontal and vertical interconnect patterns.

32. The apparatus of claim 31, wherein the highest crosstalk associated with the combination relates to crosstalk associated with one of a vertical interconnect or a horizontal interconnect.

33. An apparatus for optimizing interconnect patterns in a semiconductor device, comprising:
    means for generating a plurality of interconnect patterns for configuring a set of interconnects on one or more layers of a circuit board, wherein each interconnect pattern is different from the other interconnect patterns and defines a plurality of longitudinal slots including longitudinal slots occupied by the set of interconnects;
    means for determining a highest crosstalk for each of the interconnect patterns, wherein the highest crosstalk for the each interconnect pattern corresponds to one of the longitudinal slots; and
    means for selecting a preferred interconnect pattern from the plurality of interconnect patterns, wherein the preferred interconnect pattern provides a lower highest crosstalk than the highest crosstalk associated with each of the other interconnect patterns.

34. The apparatus of claim 33, wherein the plurality of longitudinal slots comprises at least one unoccupied longitudinal slot.

35. The apparatus of claim 34, wherein the plurality of interconnect patterns defines pluralities of longitudinal slots on at least two substantially parallel planes within the one or more layers of the circuit board.

36. The apparatus of claim 35, wherein the at least two substantially parallel planes are provided between two substantially parallel reference planes.

37. The apparatus of claim 34, wherein two interconnect patterns are different from one another only when the two interconnect patterns assign at least one interconnect to different longitudinal slots.

38. The apparatus of claim 33, wherein the highest crosstalk for the each interconnect pattern corresponds to the highest crosstalk afflicting one of the longitudinal slots.

39. The apparatus of claim 33, wherein the highest crosstalk for the each interconnect pattern corresponds to the highest crosstalk generated by an interconnect occupying one of the longitudinal slots.

40. The apparatus of claim 33, wherein the means for determining the highest crosstalk for each of the interconnect patterns models the set of interconnects as microstrip or dual stripline transmission lines.

41. The apparatus of claim 40, wherein the highest crosstalk for the each interconnect pattern comprises far-end crosstalk.

42. The apparatus of claim 33, wherein the means for determining the highest crosstalk for each of the interconnect patterns models the set of interconnects as stripline transmission lines.

43. The apparatus of claim 42, wherein the highest crosstalk for the each interconnect pattern comprises near-end crosstalk.

44. The apparatus of claim 33, wherein the highest crosstalk for each of the interconnect patterns is determined for a plurality of frequencies.

45. The apparatus of claim 33, wherein the highest crosstalk for each of the interconnect patterns is determined for a range of frequencies.

46. The apparatus of claim 33, further comprising:
    means for forming a set of interconnects on a chip carrier or circuit board in accordance with the preferred interconnect pattern.

47. The apparatus of claim 46, wherein means for selecting a preferred interconnect pattern selects a vertical interconnect pattern that controls an arrangement of vertical interconnects orthogonal to the one or more layers, wherein a combination of the preferred interconnect pattern and the vertical interconnect pattern is calculated to provide a lower highest crosstalk associated with the combination than the highest crosstalk associated with other combinations of horizontal and vertical interconnect patterns.

48. The apparatus of claim 47, wherein the highest crosstalk associated with the combination relates to crosstalk associated with one of a vertical interconnect or a horizontal interconnect.

49. A non-transitory processor-readable storage medium having one or more instructions which, when executed by at least one processing circuit, cause the at least one processing circuit to:
    generate a plurality of interconnect patterns for configuring a set of interconnects on one or more layers of a circuit board, wherein each interconnect pattern is different from the other interconnect patterns and defines a plurality of longitudinal slots including longitudinal slots occupied by the set of interconnects;
    determine a highest crosstalk for each of the interconnect patterns, wherein the highest crosstalk for the each interconnect pattern corresponds to one of the longitudinal slots; and
    select a preferred interconnect pattern from the plurality of interconnect patterns, wherein the preferred interconnect pattern provides a lower highest crosstalk than the highest crosstalk associated with each of the other interconnect patterns.

50. The non-transitory processor-readable storage medium of claim 49, wherein the plurality of longitudinal slots comprises at least one unoccupied longitudinal slot.

51. The non-transitory processor-readable storage medium of claim 50, wherein the plurality of interconnect patterns defines pluralities of longitudinal slots on at least two substantially parallel planes within the one or more layers of the circuit board.

52. The non-transitory processor-readable storage medium of claim 51, wherein the at least two substantially parallel planes are provided between two substantially parallel reference planes.

53. The non-transitory processor-readable storage medium of claim 50, wherein two interconnect patterns are different from one another only when the two interconnect patterns assign at least one interconnect to different longitudinal slots.

54. The non-transitory processor-readable storage medium of claim 49, wherein the highest crosstalk for the each interconnect pattern corresponds to the highest crosstalk afflicting one of the longitudinal slots.

55. The non-transitory processor-readable storage medium of claim 49, wherein the highest crosstalk for the each interconnect pattern corresponds to the highest crosstalk generated by an interconnect occupying one of the longitudinal slots.

56. The non-transitory processor-readable storage medium of claim 49, wherein the processor-readable storage medium has one or more instructions which when executed by the at least one processing circuit causes the at least one processing circuit to:

determine the highest crosstalk for each of the interconnect patterns by modeling the set of interconnects as microstrip or dual stripline transmission lines.

57. The non-transitory processor-readable storage medium of claim 56, wherein the highest crosstalk for the each interconnect pattern comprises far-end crosstalk.

58. The non-transitory processor-readable storage medium of claim 49, wherein the processor-readable storage medium has one or more instructions which when executed by the at least one processing circuit causes the at least one processing circuit to:
determine the highest crosstalk for each of the interconnect patterns by modeling the set of interconnects as stripline transmission lines.

59. The non-transitory processor-readable storage medium of claim 58, wherein the highest crosstalk for the each interconnect pattern comprises near-end crosstalk.

60. The non-transitory processor-readable storage medium of claim 49, wherein the highest crosstalk for each of the interconnect patterns is determined for a plurality of frequencies.

61. The non-transitory processor-readable storage medium of claim 49, wherein the highest crosstalk for each of the interconnect patterns is determined for a range of frequencies.

62. The non-transitory processor-readable storage medium of claim 49, wherein the processor-readable storage medium has one or more instructions which when executed by the at least one processing circuit causes the at least one processing circuit to:
cause a set of interconnects to be formed on a chip carrier or circuit board in accordance with the preferred interconnect pattern.

63. The non-transitory processor-readable storage medium of claim 62, wherein the processor-readable storage medium has one or more instructions which when executed by the at least one processing circuit causes the at least one processing circuit to:
select a vertical interconnect pattern that controls an arrangement of vertical interconnects orthogonal to the one or more layers, wherein a combination of the preferred interconnect pattern and the vertical interconnect pattern is calculated to provide a lower highest crosstalk associated with the combination than the highest crosstalk associated with other combinations of horizontal and vertical interconnect patterns.

64. The non-transitory processor-readable storage medium of claim 63, wherein the highest crosstalk associated with the combination relates to crosstalk associated with one of a vertical interconnect or a horizontal interconnect.

65. A semiconductor device, comprising:
a chip carrier or a circuit board having one or more layers; and
a plurality of longitudinal slots defined in at least one of the one or more layers, wherein a set of interconnects occupies certain of the plurality of longitudinal slots in accordance with an interconnect pattern, wherein:
the interconnect pattern is one of a plurality of interconnect patterns generated based on a number of signals interconnected by the set of interconnects; and
the interconnect pattern is selected from the plurality of interconnect patterns when a maximum crosstalk power estimated or calculated for the interconnect pattern is lower than maximum crosstalk powers estimated or calculated for the other interconnect patterns.

\* \* \* \* \*